UNITED STATES PATENT OFFICE.

AUGUSTE JAS, OF NEW ORLEANS, LOUISIANA.

IMPROVEMENT IN DISSOLVING TRIBASIC PHOSPHATE OF LIME IN WATER CONTAINING CARBONIC ACID.

Specification forming part of Letters Patent No. 164,457, dated June 15, 1875; application filed February 6, 1875.

*To all whom it may concern:*

Be it known that I, AUGUSTE JAS, a citizen of France, now residing in the city of New Orleans, Louisiana, have made a certain new and useful discovery relative to the treatment of tribasic phosphate of lime, of which the following is a specification:

This discovery consists in dissolving tribasic phosphate of lime in pure water, or water combined with various substances, by means of a current of carbonic-acid gas, at a greater or less degree of pressure, according to the quantity to be dissolved.

The advantage and utility of this discovery is this, that it permits the administration to patients of that invaluable medicinal substance, tribasic phosphate of lime, in such a form as to allow of its immediate absorption and assimilation in the animal economy, whereas at present it can only be administered in an insoluble state, wherein it is repugnant to the taste, or else in combination with acids which change its nature and composition. By my discovery this tribasic phosphate of lime, in a soluble state, may also be administered to patients in the agreeable and palatable guise of mineral and gaseous waters, sirups, elixirs, &c., or in a combination of these liquids with various medicinal substances.

Having thus described my discovery, what I claim, and desire to secure by Letters Patent, is—

The mode or process above set forth and described of dissolving tribasic phosphate of lime in water containing carbonic acid.

A. JAS.

Witnesses:
    ALBERT C. JANIN,
    E. FIXARY.